Figure 1:
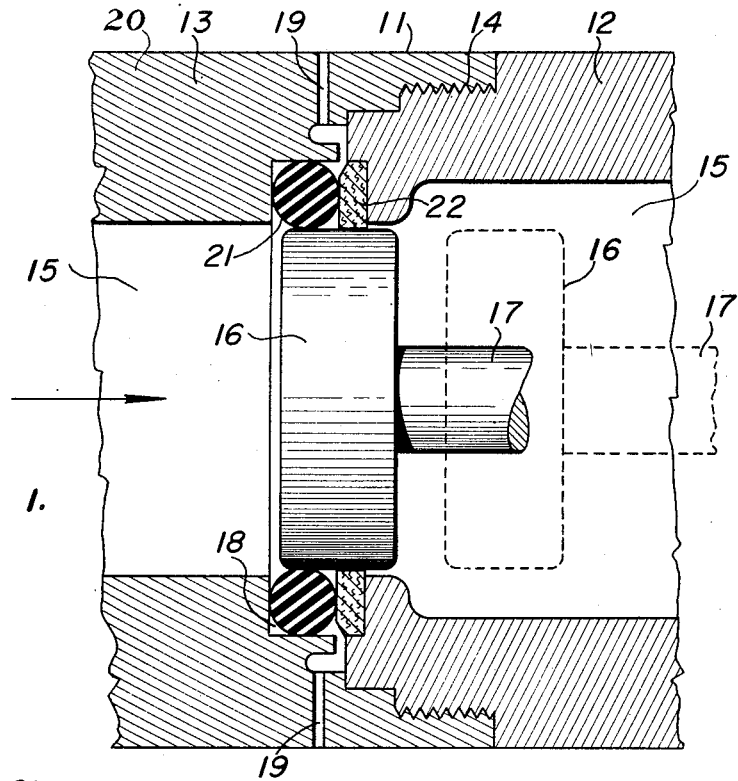

Jan. 22, 1957     T. J. BOLLING, JR     2,778,598
VALVE WITH PRESSURE SEALING DEVICE
Filed July 20, 1953

INVENTOR.
Thomas J. Bolling Jr.,
BY
ATTORNEY.

United States Patent Office 2,778,598
Patented Jan. 22, 1957

2,778,598

VALVE WITH PRESSURE SEALING DEVICE

Thomas J. Bolling, Jr., Houston, Tex., assignor, by mesne assignments, to Esso Research and Engineering Company, Elizabeth, N. J., a corporation of Delaware Application July 20, 1953, Serial No. 368,933

7 Claims. (Cl. 251—63)

The present invention is directed to a device for sealing against high pressures. More particularly, the invention is directed to apparatus for maintaining a packing member in place in high pressure operations. In its more specific aspects, the invention has to do with an improved high pressure sealing apparatus involving a plurality of packing members.

The present invention may be briefly described as involving a housing such as a valve housing provided with a first passageway for flow of fluids through the housing under a high pressure. Arranged in an interior wall of the housing opening into and communicating with the first passageway is an annular recess. This recess may be rectangular in cross section. The housing is provided with a second passageway which communicates the recess with an exterior surface of the housing under a pressure less than the pressure in the first passageway. The second passageway has a point of entry into the recess remote from the opening of the recess into the first passageway. A first deformable annular packing member defining an arcuate surface having vertical cross-sectional diameter less than the greatest cross-sectional diameter and greater than the smallest cross-sectional diameter of the recess is arranged in the recess. In contact with the first packing member is a second deformable annular packing member defining in vertical cross-section substantially a rectangular surface. The second deformable packing member is arranged in the recess downstream from the flow of fluid under high pressure. The second packing member has a beveled surface adjacent the second passageway and has a cross-sectional diameter across its minor axis less than the vertical cross-ectional diameter of the first packing member. The cross-sectional diameter of the second packing member across its major axis is equal to the vertical cross-sectional diameter of the first packing member such that the first and second packing members project into the first passageway. Arranged in the first passageway is a sealing member for closing the first passageway. The sealing member is provided with a means for moving the same into contact with the first and second packing member. The first and second packing means project into the first passageway a sufficient distance to form a seal with the sealing member on movement of the sealing member into contact with the second and first packing members.

The second passageway is preferably arranged to surround the annular recess and communicate with the exterior surface of the housing. The annular recess is in uninterrupted communication with the second passageway.

The first deformable packing member is suitably constructed of a deformable material, such as natural or synthetic rubber, or the like. For example, a plastic, or an elastomer or any other material which has a tendency to extrude or flow under pressure may be used as a constructural material for the first deformable packing member.

Likewise the second deformable packing member may be constructed of natural or synthetic rubber or a plastic, such as "Teflon," which is a trade name for polytetraflouroethylene. Preferably, however, the second packing member is constructed of leather.

The first packing member is known to the trade as an O-ring and defines an arcuate surface.

The second packing member defines in vertical cross section substantially a rectangular surface with one corner of it beveled for arrangement adjacent the second or lateral passageway.

Figure 2:
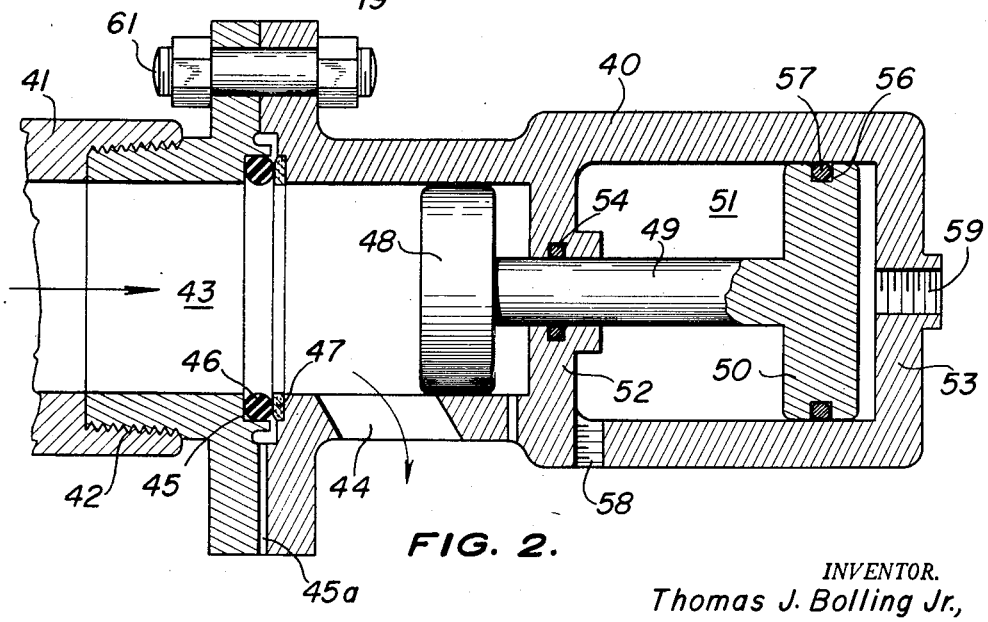

The present invention will be further illustrated by reference to the drawing in which Fig. 1 shows a detail of the arrangement of the present invention in a housing; and Fig. 2 shows the utilization of the invention in a valve, such as a mud valve employed in oil well drilling operations.

Referring now to the drawing, numeral 11 designates generally a housing which may be constructed of a first element 12 and a second element 13 which are threadably connected by mating threads 14. The housing 11 is provided with a central or longitudinal passageway 15 through which high pressure fluid is flowing in the direction shown by the arrow. Arranged in the central passageway 15 is a sealing plug or member 16 which is suitably connected by an arm 17 to means for moving the sealing plug in the passageway 15. The housing 11 defines with a wall thereof a rectangular recess 18 which communicates through a lateral passageway 19 with the exterior surface 20 of the housing. Arranged in the recess 18 is an annular deformable packing member or O-ring 21 suitably constructed of rubber which has a vertical cross-sectional diameter greater than the vertical cross-sectional diameter of recess or groove 18 and less than the horizontal cross-sectional diameter of recess or groove 18 such that the O-ring 21 projects slightly into the passageway 15. Arranged in the recess 18 in contact with the O-ring 21 is a second deformable packing member 22 suitably constructed of leather which has a cross-sectional diameter across its major axis equal to the vertical cross-sectional diameter of the O-ring 21 and a cross-sectional diameter across its minor axis less than the vertical cross-sectional diameter of the O-ring 21. It will be clear that the packing member 22 and the packing member 21 are in contact with the plug 16 when the plug 16 is in sealing position as shown. The plug 16 when in non-sealing position may be in the position as shown by the dotted lines.

Referring now to Fig. 2 a housing generally indicated as 40 defines a mud valve connected to a conduit 41 by mating threads 42. The conduit 41 and the housing 40 have a passageway 43 through which mud and the like may flow from the conduit 41 to the outlet 44. Arranged in the housing 40 is a recess 45 which communicates with an exterior surface of the housing 40 by means of a weeper hole or passageway 45a. Arranged in the recess is a first annular deformable packing member, such as an O-ring 46, and a second annular deformable packing member 47. The deformable packing means 46 and 47 may preferably be constructed of rubber and leather, respectively, and have shapes such as shown in Fig. 1.

Arranged in the passageway 43 for movement therein is a piston or sealing plug 48 which is connected by an elongated member 49 to a piston member 50 in chamber 51, in housing 40, defined by a wall member 52 and a closure wall 53.

The member 49 passes through the wall member 52 and is sealed against flow of fluid by a sealing member 54 in a recess in the wall member 52. The sealing member 54 may suitably be an O-ring constructed of a deformable material as has been described.

The piston 50 is also provided with a recess 56 in which is arranged a sealing member 57 such as an O-ring constructed of deformable material, such as has been described before.

The chamber 51 has a first inlet 58 and a second inlet 59 in the closure wall 53. The housing 40 may be constructed in parts which may be held together by threaded bolts 61.

The apparatus of the present invention works in the following manner: Thus when an O-ring, such as indicated by numeral 46, is exposed to relatively high pressure such as 1000 pounds per square inch or higher, the deformable material has a tendency to flow or protrude from the recess into the passageway or clearance between operating parts coming into contact therewith. By combining a pressure relief across the O-ring through the lateral passageway, it is possible to prevent the O-ring from being extruded when a member moves against it or moves away from the O-ring. Also by providing a second packing member to seal against the moving member, the second packing member is forced into contact with the member 16 instead of the O-ring and thus protecting the latter. Thus in accordance with Fig. 1 when the sealing member 16 moves into contact with the packing members 21 and 22, the pressure differential across the O-ring or sealing member 21 from the passageway 15 to the surface 20 through the passageway 19 causes the O-ring to seek extrusion through the passageway 19 which it cannot by virtue of its construction. Also at the same time, the force exerted against the O-ring is tending to pop the O-ring from the recess 18. The packing member 22 provides a seal between the O-ring 21 and the plug 16 when the latter is being moved from sealing to the open position as shown by the dotted lines maintaining the O-ring 21 in the recess 18, the pressure exerted against the packing member 22 maintaining it also in the recess 18.

With respect to Fig. 2, the same phenomenon exists in that the pressure is exerted across the O-ring 46 through the weeper hole 45a causing the O-ring to be confined in the recess. On movement of the piston 48 into contact with the sealing members 46 and 47, the sealing member 47 serves to protect the O-ring 46 against extrusion from the recess into the passageway 43 either ahead or following the piston 48 as it moves into contact or out of contact with the sealing members.

The piston 48 may be suitably moved into and out of contact with the sealing members 46 and 47 by introduction of air into the inlet 59 against the piston 50 and allowing air to be exhausted through the opening 58. Likewise when the piston 48 is to be moved to the right, air or other suitable fluid may be introduced into inlet 58 and exhausted through opening 59.

The following requirements are necessary for the successful practice of the device of the present invention. In my invention the first packing member or O-ring must be confined on four sides. It must be confined on three sides by the walls of the recess and by the sealing plug, such as 16 or 48, and on the other side by the second packing member, such as 22 or 47. The lateral or second passageway must be behind the O-ring and downstream from the high pressure side of the fluid flow. Also the second packing member or the leather packing member must be downstream from the high pressure side and on the same side as the second or lateral passageway. The recess must have a depth less than the thickness of the first and second packing members. The second packing member must be beveled to allow the lateral or second passageway to communicate with the first packing member. The first and second packing members must project into the central or longitudinal passageway of the housing a sufficient amount to form a seal with the sealing plug. Stating this otherwise, the inside diameter of the second packing member must be less than the outside diameter of the sealing plug or member to insure a tight fit between the sealing plug and the second packing member. Also the second packing member and the first packing member must have diameters sufficient to project into the central passageway to form a seal with the sealing plug.

The nature and objects of the present invention having been completely described and illustrated, what I wish to claim as new and useful and to secure by Letters Patent is:

1. A device for sealing against high pressure which comprises, in combination: a housing provided with a first passageway for flow of fluids under high pressure having an annular recess arranged in an interior wall of the housing opening into and communicating with said first passageway; said housing being provided with at least a second passageway communicating said recess with an exterior surface of the housing under a pressure less than the fluid pressure within the first passageway and having a point of entry into said recess remote from the opening of the recess into the first passageway; a first deformable annular packing member arranged in said recess and defining an arcuate surface having a vertical cross-sectional diameter less than the greatest and greater than the smallest cross-sectional diameter of the recess; a second deformable annular packing member defining in vertical cross section substantially a rectangular surface and arranged in said recess in contact with said first deformable packing member downstream from the flow of fluid under high pressure; said second packing member having at least a beveled surface adjacent said second passageway, a cross-sectional diameter across its minor axis less than the vertical cross-sectional diameter of the first packing member and a cross-sectional diameter across its major axis equal to the cross-sectional diameter of the first packing member such that said first and second packing members project into the first passageway; said first and second deformable packing members also being in contact with the wall of the recess to fill substantially the recess; and a sealing member arranged in said first passageway for closing said first passageway; said first and second packing members projecting into said first passageway a sufficient distance to form a seal with said sealing member on movement of said sealing member into contact with said second and first packing members such that said first packing member is confined in said recess by said sealing member and by said second packing member, said sealing member moving upstream in said first passageway into contact with said second and first packing members in sequence and downstream out of contact with said first and second packing members in sequence.

2. A device in accordance with claim 1 in which the second passageway is located in said housing surrounding the annular recess and is in uninterrupted communication with the recess.

3. A device for sealing against high pressure which comprises, in combination: a housing provided with a central passageway for flow of fluids under high pressure having an annular recess arranged in an interior wall of the housing opening into and communicating with said central passageway; said housing being provided with at least a lateral passageway communicating said recess with an exterior surface of the housing under a pressure less than the fluid pressure within the first passageway and having a point of entry into said recess remote from the opening of the recess into the central passageway; a first deformable rubber annular packing member defining an arcuate surface having a vertical cross-sectional diameter less than the greatest and greater than the smallest cross-sectional diameter of the recess arranged in said recess; a second deformable leather annular packing member defining in vertical cross section substantially a rectangular surface arranged in said recess in contact with said first deformable packing member downstream from the flow of fluid under high pressure; said second packing member having at least a beveled surface adjacent said lateral passageway, a cross-sectional diameter across its minor axis less than the vertical cross-sectional diameter of the first packing member and a cross-sectional diameter across its major axis equal to the vertical cross-sectional diameter of the first packing member such that said first and second packing members project into the central passageway; said first and second deformable packing members also being in contact with the wall of the recess to fill substantially the recess; and a sealing member arranged in said first passageway for closing said central passageway; said first and second packing members projecting into said central passageway a sufficient distance to form a seal with said sealing member on movement of said sealing member into contact with said second and first packing members such that said first packing member is confined in said recess by said sealing member and by said second packing member, said sealing member moving upstream in said central passageway into contact with said second and first packing members in sequence and downstream out of contact with said first and second packing members in sequence.

4. A device in accordance with claim 3 in which the lateral passageway is located in said housing surrounding the annular recess and is in uninterrupted communication with the recess.

5. A device for sealing against high pressure which comprises, in combination: a housing provided with a longitudinal passageway for flow of fluids under high pressure having an annular recess arranged in an interior wall of the housing opening into and communicating with said longitudinal passageway; said housing being provided with a least a lateral passageway communicating said recess with an exterior surface of the housing under a pressure less than the fluid pressure within the first passageway and having a point of entry into said recess remote from the opening of the recess into the longitudinal passageway; a first deformable rubber annular packing member defining an arcuate surface having a vertical cross-sectional diameter less than the greatest and greater than the smallest cross-sectional diameter of the recess arranged in said recess; a second deformable leather annular packing member defining in vertical cross section substantially a rectangular surface arranged in said recess in contact with said first deformable packing member downstream from the flow of fluid under high pressure; said second packing member having at least a beveled surface adjacent said lateral passageway, a cross-sectional diameter across its minor axis less than the vertical cross-sectional diameter of the first packing member and a cross-sectional diameter across its major axis equal to the vertical cross-sectional diameter of the first packing member such that said first and second packing members project into the longitudinal passageway; said first and second deformable packing members also being in contact with the wall of the recess to fill substantially the recess; a sealing member arranged in said longitudinal passageway for closing said longitudinal passageway; said first and second packing members projecting into said first passageway a sufficient distance to form a seal with said sealing member on movement of said sealing member into contact with said second and first packing members such that said first packing member is confined in said recess by said sealing member and by said second packing member; and means for moving said sealing member into contact with said packing members, said sealing member moving upstream in said first passageway into contact with said second and first packing members in sequence and downstream out of contact with said first and second packing members in sequence.

6. A device for sealing against high pressure which comprises, in combination: a housing provided with a first passageway for flow of fluids under high pressure having an annular rectangular recess arranged in an interior wall of the housing opening into and communicating with said first passageway; said housing being provided with at least a second passageway communicating said recess with an exterior surface of the housing under a pressure less than the fluid pressure within the first passageway and having a point of entry into said recess remote from the opening of the recess into the first passageway; said second passageway surrounding the annular recess and being in uninterrupted communication with the recess; a first deformable rubber annular packing member defining an arcuate surface having a vertical cross-sectional diameter less than the greatest and greater than the smallest cross-sectional diameter of the recess arranged in said recess; a second deformable leather annular packing member defining in vertical cross section substantially a rectangular surface arranged in said recess in contact with said first deformable packing member downstream from the flow of fluid under high pressure; said second packing member having at least a beveled surface adjacent said second passageway, a cross sectional diameter across its minor axis less than the cross-sectional diameter of the first packing member and a cross-sectional diameter across its major axis equal to the vertical cross-sectional diameter of the first packing member such that said first and second packing members project into the first passageway; said first and second deformable packing members also being in contact with the wall of the recess to fill substantially the recess; a sealing member arranged in said first passageway for closing said first passageway; said first and second packing members projecting into said first passageway a sufficient distance to form a seal with said sealing member on movement of said sealing member into contact with said second and first packing members such that said first packing member is confined in said recess by said sealing member and by said second packing member; and means for moving said sealing member into contact with said packing members, said sealing member moving upstream in said first passageway into contact with said second and first packing members in sequence and downstream out of contact with said first and second packing members in sequence.

7. A device for sealing against high pressure which comprises, in combination, a housing having a bore therein and provided with inlet and outlet passages communicating with said bore, a sealing member reciprocable in said bore and having a surface portion cooperating with a surface portion of said bore between said inlet and outlet to control fluid flow under high pressure through said bore, one of said surface portions having an annular recess arranged therein opening into the bore, said recess being provided with a passageway communicating said recess with a pressure less than the fluid pressure within the bore and having a point of entry into said recess remote from the opening of the recess into the bore, a first deformable annular member arranged in said recess defining an arcuate surface having a vertical cross-sectional diameter less than the greatest and greater than the smallest vertical cross-sectional diameter of the recess, a second deformable annular packing member defining in vertical cross section a substantially rectangular surface arranged in said recess in contact with said first deformable packing member downstream from the flow of fluid under high pressure from the inlet to the outlet of said bore, said second packing member having at least a beveled surface adjacent said passageway, a cross-sectional diameter across its minor axis less than the vertical cross-sectional diameter of the first packing member and a cross-sectional diameter across its major axis equal to the vertical cross-sectional diameter of the first packing member such that said first and second packing members project into the bore, said first and second deformable packing members also being in contact with the wall of the recess to fill substantially the recess; said first and second packing members projecting into said bore a sufficient distance to form a seal between said surfaces on movement of said sealing member into cooperating relationship such that said first packing member is confined in said recess by one of said surfaces and by said second packing member, said sealing member moving upstream in said bore to bring said surfaces into cooperating relationship and downstream in said bore to remove said surfaces from cooperating relationship.

References Cited in the file of this patent

UNITED STATES PATENTS

| | | |
|---|---|---|
| 2,437,814 | Hallen | Mar. 16, 1948 |
| 2,456,356 | Aber | Dec. 14, 1948 |
| 2,716,997 | Crookston | Sept. 6, 1955 |
| 2,722,402 | Crookston | Nov. 1, 1955 |

FOREIGN PATENTS

| | | |
|---|---|---|
| 12,911 | Great Britain | of 1904 |
| 662,448 | Great Britain | Dec. 5, 1951 |